US012806460B2

(12) United States Patent
Pena et al.

(10) Patent No.: US 12,806,460 B2
(45) Date of Patent: Nov. 24, 2026

(54) FIRE DETECTION SYSTEM WITH MULTIPLE STAGE ALARMS

(71) Applicant: Tyco Fire Products LP, Lansdale, PA (US)

(72) Inventors: Pedriant Pena, Berkley, MA (US); Robert D. Heon, Warwick, RI (US); Jacob Joseph Dube, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 592 days.

(21) Appl. No.: 17/612,262

(22) PCT Filed: May 21, 2020

(86) PCT No.: PCT/IB2020/054850
§ 371 (c)(1),
(2) Date: Nov. 18, 2021

(87) PCT Pub. No.: WO2020/234827
PCT Pub. Date: Nov. 26, 2020

(65) Prior Publication Data
US 2022/0212046 A1 Jul. 7, 2022

(51) Int. Cl.
*A62C 37/40* (2006.01)
*A62C 37/12* (2006.01)
*A62C 37/50* (2006.01)

(52) U.S. Cl.
CPC .............. *A62C 37/40* (2013.01); *A62C 37/12* (2013.01); *A62C 37/50* (2013.01)

(58) Field of Classification Search
CPC ......... A62C 37/12; A62C 37/38; A62C 37/40; A62C 37/42; A62C 37/44; A62C 37/50
(Continued)

(56) References Cited

U.S. PATENT DOCUMENTS

2002/0135488 A1* 9/2002 Hibbs .................... G08B 21/20 340/584
2004/0056765 A1 3/2004 Anderson et al.
(Continued)

FOREIGN PATENT DOCUMENTS

KR 101940496 B1 1/2019
WO WO-2018/089606 A1 5/2018
WO WO-2018175495 A1 * 9/2018 ............. A62C 3/006

OTHER PUBLICATIONS

International Search Report and Written Opinion on International Application No. PCT/IB2020/054850, mail date Aug. 14, 2020, 21 pages.

*Primary Examiner* — Cody J Lieuwen
(74) *Attorney, Agent, or Firm* — Foley & Lardner LLP

(57) ABSTRACT

A fire suppression system includes a temperature sensor, a suppression system activator, and processing circuitry. The temperature sensor monitors a temperature and the suppression system activator can activate the fire suppression system to suppress a fire. The processing circuitry can determine a fire alert in response to the monitored temperature exceeding a temperature threshold value and adjust a polling rate of the temperature sensor in response to the temperature exceeding the temperature threshold value. The processing circuitry can determine a rate of change of the monitored temperature over a time period and activates the fire suppression system in response to the rate of change exceeding the rate of change threshold.

17 Claims, 5 Drawing Sheets

(58) Field of Classification Search
USPC ........................................................ 169/60, 61
See application file for complete search history.

(56) References Cited

U.S. PATENT DOCUMENTS

| | | | | |
|---|---|---|---|---|
| 2015/0021054 | A1* | 1/2015 | McNamara .......... | A62C 35/023 169/61 |
| 2015/0297930 | A1* | 10/2015 | Nikkarila ............... | A62C 37/40 169/46 |
| 2016/0321900 | A1* | 11/2016 | Rao ......................... | B05B 12/12 |
| 2019/0015688 | A1* | 1/2019 | Stimek ................... | A62C 3/006 |
| 2019/0019387 | A1* | 1/2019 | Birnkrant ............. | G08B 17/107 |
| 2019/0054333 | A1 | 2/2019 | Mcnamara et al. | |

* cited by examiner

FIRE DETECTION SYSTEM WITH MULTIPLE STAGE ALARMS

CROSS-REFERENCE TO RELATED PATENT APPLICATION

This application claims the benefit of and priority to U.S. Provisional Patent Application No. 62/851,197, filed May 22, 2019, the entire disclosure of which is incorporated by reference herein.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppression agent throughout the area. The fire suppressant agent then extinguishes or prevents the growth of the fire.

SUMMARY

One implementation of the present disclosure is a fire suppression system. In some embodiments, the fire suppression system includes a temperature sensors, a suppression system activator, and processing circuitry. In some embodiments, the temperature sensor is configured to monitor a temperature. In some embodiments, the suppression system activator is configured to activate the fire suppression system to suppress a fire. In some embodiments, the processing circuitry is configured to determine a fire alert in response to the monitored temperature exceeding a temperature threshold value. In some embodiments, the processing circuitry is configured to adjust a polling rate of the temperature sensor in response to the temperature exceeding a temperature threshold value. In some embodiments, the processing circuitry is configured to determine a rate of change of the monitored temperature over a time period. In some embodiments, the processing circuitry is configured to activate the fire suppression system in response to the rate of change exceeding the rate of change threshold value.

In some embodiments, the fire suppression system includes multiple temperature sensors configured to monitor multiple temperature values at multiple different locations. In some embodiments, the processing circuitry is configured to determine the fire alert in response to at least one of the multiple monitored temperature value exceeding the temperature threshold value. In some embodiments, the processing circuitry is configured to adjust a polling rate of the multiple temperature sensors in response to at least one of the multiple monitored temperatures exceeding the temperature threshold value. In some embodiments, the processing circuitry is configured to determine a rate of change of at least one of the monitored temperatures over the time period. In some embodiments, the processing circuitry is configured to determine a fire warning in response to the rate of change of at least one of the multiple monitored temperatures over the time period exceeding the rate of change threshold value. In some embodiments, the processing circuitry is configured to activate the fire suppression system in response to the rate of change of at least one of the multiple monitored temperatures exceeding the rate of change threshold value.

In some embodiments, the processing circuitry is further configured to monitor the rate of change of at least one of the multiple monitored temperatures over a monitoring time period.

In some embodiments, the processing circuitry is further configured to activate the fire suppression system in response to at least one of one or more of the multiple monitored temperatures exceeding a maximum allowable temperature threshold value, and the monitored rate of change of at least one of the multiple monitored temperatures being continuous over the monitoring time period.

In some embodiments, the processing circuitry is further configured to output at least one of a visual alert, an aural alert, and a remote alert in response to any of the fire alert, the fire warning, and an indication of the activation of the fire suppression system.

In some embodiments, the remote alert includes at least one of a text message, an email, or a phone call.

In some embodiments, the processing circuitry is further configured to determine an average temperature of the multiple monitored temperatures.

In some embodiments, the processing circuitry is further configured adjust the polling rate of the multiple temperature sensors in response to the average temperature exceeding a reference value by a predefined amount.

Another implementation of the present disclosure is a method for detecting a fire and automatically activating a fire suppression system. In some embodiments, the method includes providing multiple temperature sensors configured to monitor multiple temperatures. In some embodiments, the method includes providing a fire suppression system configured to suppress a fire. In some embodiments, the method includes determining a fire alert in response to at least one of the multiple monitored temperatures exceeding a temperature threshold value. In some embodiments, the method includes adjusting a polling rate of the multiple temperature sensors in response to at least one of the multiple monitored temperatures exceeding a temperature threshold value. In some embodiments, the method includes determining a rate of change of at least one of the multiple monitored temperatures over a time period. In some embodiments, the method includes activating the fire suppression system in response to the rate of change exceeding a rate of change threshold value.

In some embodiments, the method further includes determining a fire warning in response to the rate of change exceeding the rate of change threshold value. In some embodiments, the method includes outputting any of the fire alert, the fire warning, or an indication of the activation of the fire suppression system to a user. In some embodiments, the method includes monitoring the rate of change of at least one of the multiple monitored temperatures over a monitoring time period.

In some embodiments, the method further includes activating the fire suppression system in response to at least one of one or more of the multiple monitored temperatures exceeding a maximum allowable temperature threshold value or the monitored rate of change of at least one of the multiple monitored temperatures being continuous over the monitoring time period.

In some embodiments, the method further includes at least one of a visual alert, an aural alert, and a remote alert in response to any of the fire alert, the fire warning, or the indication of the activation of the fire suppression system.

In some embodiments, the remote alert includes at least one of a text message, an email, or a phone call.

In some embodiments, the method further includes determining an average temperature of the multiple monitored temperatures.

In some embodiments, the method further includes adjusting the polling rate of the multiple temperatures in response to the average temperature exceeding a reference value by a predefined amount.

Another implementation of the present disclosure is a controller for a fire suppression system. In some embodiments, the controller includes processing circuitry configured to receive sensor data from multiple temperature sensors indicating multiple monitored temperatures. In some embodiments, the processing circuitry is configured to determine a fire alert in response to any of the multiple monitored temperatures exceeding a temperature threshold value. In some embodiments, the processing circuitry is configured to adjust a polling rate of one or more of the multiple temperature sensors in response to any of the multiple monitored temperatures exceeding the temperature threshold value. In some embodiments, the processing circuitry is configured to activate a fire suppression system in response to a rate of change of the plurality of monitored temperatures over a time period exceeding a rate of change threshold.

In some embodiments, the processing circuitry is further configured to determine an average temperature of the multiple monitored temperatures. In some embodiments, the processing circuitry is configured to adjust the polling rate of the multiple temperatures in response to the average temperature exceeding a reference value by a predefined amount.

In some embodiments, the processing circuitry is configured to determine a fire warning in response to the rate of change of the plurality of monitored temperatures over the time period exceeding the rate of change threshold. In some embodiments, the processing circuitry is configured to output any of the fire alert, the fire warning, or an indication of the activation of the fire suppression system to a user. In some embodiments, the processing circuitry is configured to monitor the rate of change over a monitoring time period.

In some embodiments, the processing circuitry is configured to activate the fire suppression system to provide a fire suppressant agent to an area in response to the fire warning.

In some embodiments, the processing circuitry is configured to output at least one of a visual alert, an aural alert, and a remote alert in response to any of the fire alert, the fire warning, or an indication of the activation of the fire suppression system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a fire detection and alert system is shown, according to some embodiments. The system includes a fire suppression system configured to facilitate extinguishing of a fire, one or more temperature sensors, and a controller, according to some embodiments. In some embodiments, the system includes three or more temperature sensors. In some embodiments, the controller is configured to receive temperature readings from the one or more temperature sensors and detect a hazard (e.g., a fire). In some embodiments, the controller is configured to preemptively detect a hazard or to detect that a hazard is likely to occur soon. In some embodiments, the system is configured to provide any of an alert, a notification, a warning, a message, etc., to a remote user regarding a present hazard or of the possibility that a hazard may occur. In some embodiments, the system is configured to provide any of a visual alert and an aural alert to nearby people regarding a detected fire or a predicted hazard. In some embodiments, the system identifies changes in the temperature readings over a time period to determine if the temperatures are increasing, and if a fire is likely to occur due to rapidly increasing temperatures. In some embodiments, the system activates the fire suppression system in response to detecting a fire. It would be advantageous to have a fire suppression system which can preemptively detect a hazard or detect a present hazard and provide alerts to a user.

Fire Suppression System

Figure 1:
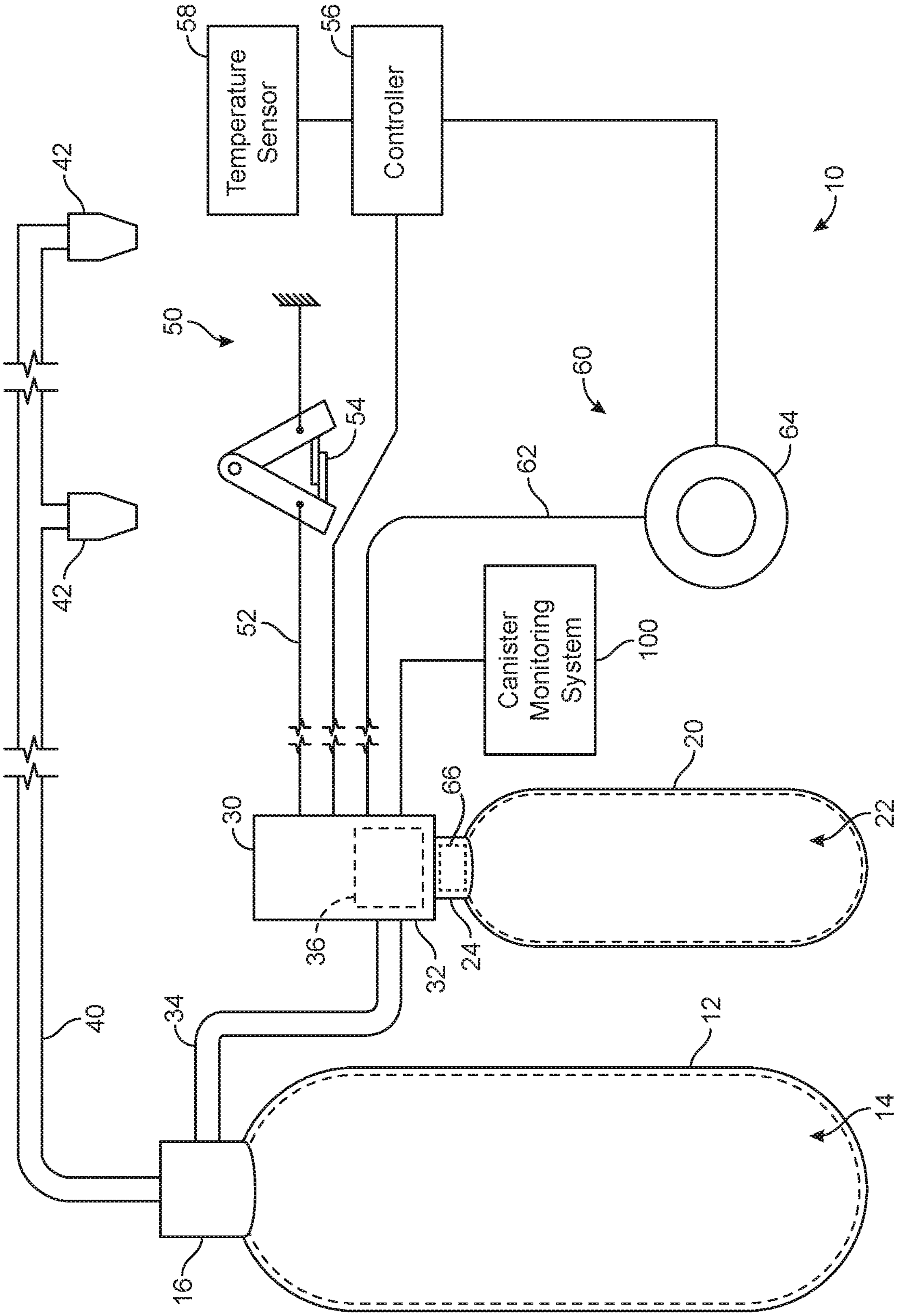
FIG. 1 is a schematic of a fire suppression system, according to an exemplary embodiment.

Referring to FIG. 1, a fire suppression system 10 is shown according to an exemplary embodiment. In one embodiment, the fire suppression system 10 is a chemical fire suppression system. The fire suppression system 10 is configured to dispense or distribute a fire suppressant agent onto and/or nearby a fire, extinguishing the fire and preventing the fire from spreading. The fire suppression system 10 can be used alone or in combination with other types of fire suppression systems (e.g., a building sprinkler system, a handheld fire extinguisher, etc.). In some embodiments, multiple fire suppression systems 10 are used in combination with one another to cover a larger area (e.g., each in different rooms of a building).

The fire suppression system 10 can be used in a variety of different applications. Different applications can require different types of fire suppressant agent and different levels of mobility. The fire suppression system 10 is usable with a variety of different fire suppressant agents, such as powders, liquids, foams, or other fluid or flowable materials. The fire suppression system 10 can be used in a variety of stationary applications. By way of example, the fire suppression system 10 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, the fire suppression system 10 can be used in a variety of mobile applications. By way of example, the fire suppression system 10 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Referring again to FIG. 1, the fire suppression system 10 includes a fire suppressant tank 12 (e.g., a vessel, container, vat, drum, tank, canister, cartridge, or can, etc.). The fire suppressant tank 12 defines an internal volume 14 filled (e.g., partially, completely, etc.) with fire suppressant agent. In some embodiments, the fire suppressant agent is normally not pressurized (e.g., is at or near atmospheric pressure). The fire suppressant tank 12 includes an exchange section, shown as neck 16. The neck 16 permits the flow of expellant gas into the internal volume 14 and the flow of fire suppressant agent out of the internal volume 14 so that the fire suppressant agent can be supplied to a fire.

The fire suppression system 10 further includes a cartridge 20 (e.g., a vessel, container, vat, drum, tank, canister, cartridge, or can, etc.). The cartridge 20 defines an internal volume 22 configured to contain a volume of pressurized expellant gas. The expellant gas can be an inert gas. In some embodiments, the expellant gas is air, carbon dioxide, or nitrogen. The cartridge 20 includes an outlet portion or outlet section, shown as neck 24. The neck 24 defines an outlet fluidly coupled to the internal volume 22. Accordingly, the expellant gas can leave the cartridge 20 through the neck 24. The cartridge 20 can be rechargeable or disposable after use. In some embodiments where the cartridge 20 is rechargeable, additional expellant gas can be supplied to the internal volume 22 through the neck 24.

The fire suppression system 10 further includes a valve, puncture device, or activator assembly, shown as actuator 30. The actuator 30 includes an adapter, shown as receiver 32, that is configured to receive the neck 24 of the cartridge 20. The neck 24 is selectively coupled to the receiver 32 (e.g., through a threaded connection, etc.). Decoupling the cartridge 20 from the actuator 30 facilitates removal and replacement of the cartridge 20 when the cartridge 20 is depleted. The actuator 30 is fluidly coupled to the neck 16 of the fire suppressant tank 12 through a conduit or pipe, shown as hose 34.

The actuator 30 includes an activation mechanism 36 configured to selectively fluidly couple the internal volume 22 to the neck 16. In some embodiments, the activation mechanism 36 includes one or more valves (e.g., valve 66) that selectively fluidly couple the internal volume 22 to the hose 34. The valves can be mechanically, electrically, manually, or otherwise actuated. In some such embodiments, the neck 24 includes valve 66 that selectively prevents the expellant gas from flowing through the neck 24. Valve 66 can be manually operated (e.g., by a lever or knob on the outside of the cartridge 20, etc.) or can open automatically upon engagement of the neck 24 with the actuator 30. Valve 66 facilitates removal of the cartridge 20 prior to depletion of the expellant gas. In other embodiments, the cartridge 20 is sealed (e.g., valve 66 may be omitted), and the activation mechanism 36 is or includes a puncturing member such as a pin, knife, nail, or other sharp object that the actuator 30 forces into contact with the cartridge 20. This punctures the outer surface of the cartridge 20, fluidly coupling the internal volume 22 with the actuator 30. In some embodiments, the activation mechanism 36 punctures the cartridge 20 only when the actuator 30 is activated. In some such embodiments, the activation mechanism 36 omits any valves that control the flow of expellant gas to the hose 34. In other embodiments, the activation mechanism 36 automatically punctures the cartridge 20 as the neck 24 engages the actuator 30.

Once the actuator 30 is activated and the cartridge 20 is fluidly coupled to the hose 34, the expellant gas from the cartridge 20 flows freely through the neck 24, the actuator 30, and the hose 34 and into the neck 16. The expellant gas forces fire suppressant agent from the fire suppressant tank 12 out through the neck 16 and into a conduit or hose, shown as pipe 40. In one embodiment, the neck 16 directs the expellant gas from the hose 34 to a top portion of the internal volume 14. The neck 16 defines an outlet (e.g., using a syphon tube, etc.) near the bottom of the fire suppressant tank 12. The pressure of the expellant gas at the top of the internal volume 14 forces the fire suppressant agent to exit through the outlet and into the pipe 40. In other embodiments, the expellant gas enters a bladder within the fire suppressant tank 12, and the bladder presses against the fire suppressant agent to force the fire suppressant agent out through the neck 16. In yet other embodiments, the pipe 40 and the hose 34 are coupled to the fire suppressant tank 12 at different locations. By way of example, the hose 34 can be coupled to the top of the fire suppressant tank 12, and the pipe 40 can be coupled to the bottom of the fire suppressant tank 12. In some embodiments, the fire suppressant tank 12 includes a burst disk that prevents the fire suppressant agent from flowing out through the neck 16 until the pressure within the internal volume 14 exceeds a threshold pressure. Once the pressure exceeds the threshold pressure, the burst disk ruptures, permitting the flow of fire suppressant agent. Alternatively, the fire suppressant tank 12 can include a valve, a puncture device, or another type of opening device or activator assembly that is configured to fluidly couple the internal volume 14 to the pipe 40 in response to the pressure within the internal volume 14 exceeding the threshold pressure. Such an opening device can be configured to activate mechanically (e.g., the force of the pressure causes the opening device to activate, etc.) or the opening device may include a separate pressure sensor in communication with the internal volume 14 that causes the opening device to activate.

The pipe 40 is fluidly coupled to one or more outlets or sprayers, shown as nozzles 42. The fire suppressant agent flows through the pipe 40 and to the nozzles 42. The nozzles 42 each define one or more apertures, through which the fire suppressant agent exits, forming a spray of fire suppressant agent that covers a desired area. The sprays from the nozzles 42 then suppress or extinguish fire within that area. The apertures of the nozzles 42 can be shaped to control the spray pattern of the fire suppressant agent leaving the nozzles 42. The nozzles 42 can be aimed such that the sprays cover specific points of interest (e.g., a specific piece of restaurant equipment, a specific component within an engine compartment of a vehicle, etc.). The nozzles 42 can be configured such that all of the nozzles 42 activate simultaneously, or the nozzles 42 can be configured such that only the nozzles 42 near the fire are activated.

In some embodiments, the fire suppression system 10 further includes an automatic activation system 50 that controls the activation of the actuator 30. The automatic activation system 50 is configured to monitor one or more conditions and determine if those conditions are indicative of a nearby fire. Upon detecting a nearby fire, the automatic activation system 50 activates the actuator 30, causing the fire suppressant agent to leave the nozzles 42 and extinguish the fire.

In some embodiments, the actuator 30 is controlled mechanically. As shown in FIG. 1, the automatic activation system 50 includes a mechanical system including a tensile member (e.g., a rope, a cable, etc.), shown as cable 52, that imparts a tensile force on the actuator 30. Without this tensile force, the actuator 30 will activate. The cable 52 is coupled to a fusible link 54, which is in turn coupled to a stationary object (e.g., a wall, the ground, etc.). The fusible link 54 includes two plates that are held together with a solder alloy having a predetermined melting point. A first plate is coupled to the cable 52, and a second plate is coupled to the stationary object. When the ambient temperature surrounding the fusible link 54 exceeds the melting point of the solder alloy, the solder melts, allowing the two plates to separate. This releases the tension on the cable 52, and the actuator 30 activates. In other embodiments, the automatic activation system 50 is another type of mechanical system that imparts a force on the actuator 30 to activate the actuator 30. The automatic activation system 50 can include linkages, motors, hydraulic or pneumatic components (e.g., pumps, compressors, valves, cylinders, hoses, etc.), or other types of mechanical components configured to activate the actuator 30. Some parts of the automatic activation system 50 (e.g., a compressor, hoses, valves, and other pneumatic components, etc.) can be shared with other parts of the fire suppression system 100 (e.g., the manual activation system 60) or vice versa.

The actuator 30 can additionally or alternatively be configured to activate in response to receiving an electrical signal from the automatic activation system 50. Referring to FIG. 1, the automatic activation system 50 includes a controller 56 that monitors signals from one or more sensors, shown as temperature sensor 58 (e.g., thermocouples, resistance temperature detectors, etc.). The controller 56 can use the signals from the temperature sensor 58 to determine if an ambient temperature has exceeded a threshold temperature. Upon determining that the ambient temperature has exceeded the threshold temperature, the controller 56 provides an electrical signal to the actuator 30. The actuator 30 then activates in response to receiving the electrical signal.

The fire suppression system 10 further includes a manual activation system 60 that controls the activation of the actuator 30. The manual activation system 60 is configured to activate the actuator 30 in response to an input from an operator. The manual activation system 60 can be included instead of or in addition to the automatic activation system 50. Both the automatic activation system 50 and the manual activation system 60 can activate the actuator 30 independently. By way of example, the automatic activation system 50 can activate the actuator 30 regardless of any input from the manual activation system 60, and vice versa.

As shown in FIG. 1, the manual activation system 60 includes a mechanical system including a tensile member (e.g., a rope, a cable, etc.), shown as cable 62, coupled to the actuator 30. The cable 62 is coupled to a human interface device (e.g., a button, a lever, a switch, a knob, a pull ring, etc.), shown as button 64. The button 64 is configured to impart a tensile force on the cable 62 when pressed, and this tensile force is transferred to the actuator 30. The actuator 30 activates upon experiencing the tensile force. In other embodiments, the manual activation system 60 is another type of mechanical system that imparts a force on the actuator 30 to activate the actuator 30. The manual activation system 60 can include linkages, motors, hydraulic or pneumatic components (e.g., pumps, compressors, valves, cylinders, hoses, etc.), or other types of mechanical components configured to activate the actuator 30.

The actuator 30 can additionally or alternatively be configured to activate in response to receiving an electrical signal from the manual activation system 60. As shown in FIG. 1, the button 64 is operably coupled to the controller 56. The controller 56 can be configured to monitor the status of a human interface device (e.g., engaged, disengaged, etc.). Upon determining that the human interface device is engaged, the controller 56 provides an electrical signal to activate the actuator 30. By way of example, the controller 56 can be configured to monitor a signal from the button 64 to determine if the button 64 is pressed. Upon detecting that the button 64 has been pressed, the controller 56 sends an electrical signal to the actuator 30 to activate the actuator 30.

The automatic activation system 50 and the manual activation system 60 are shown to activate the actuator 30 both mechanically (e.g., though application of a tensile force through cables, through application of a pressurized liquid, through application of a pressurized gas, etc.) and electrically (e.g., by providing an electrical signal). It should be understood, however, that the automatic activation system 50 and/or the manual activation system 60 can be configured to activate the actuator 30 solely mechanically, solely electrically, or through some combination of both. By way of example, the automatic activation system 50 can omit the controller 56 and activate the actuator 30 based on the input from the fusible link 54. By way of another example, the automatic activation system 50 can omit the fusible link 54 and activate the actuator 30 using an input from the controller 56.

Fire Detection and Alert System

System Overview

Figure 2:
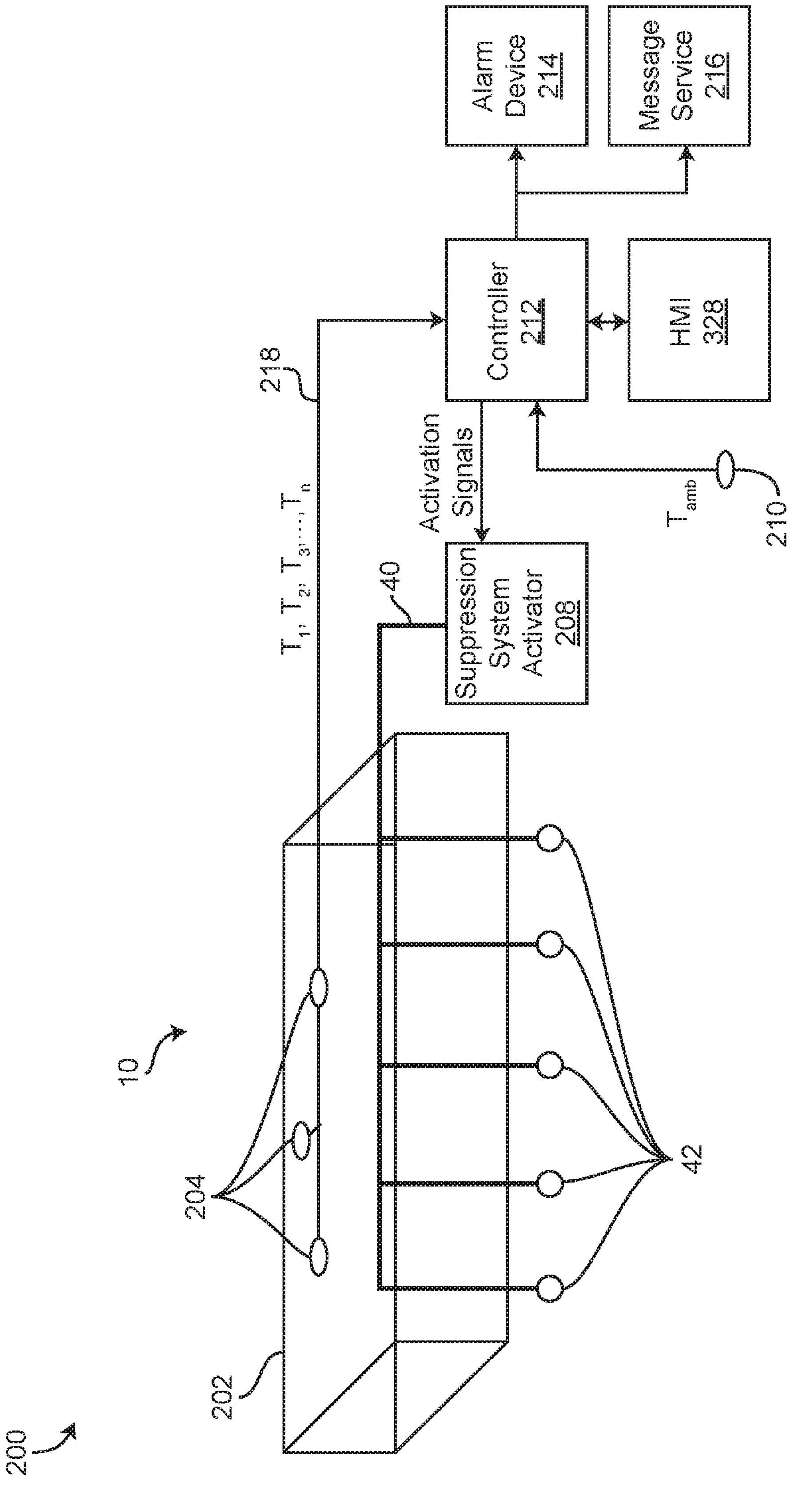
FIG. 2 is a block diagram showing a fire detection and suppression system, including a controller, according to some embodiments.

Referring now to FIG. 2, a fire detection and alert system 200 is shown, according to an exemplary embodiment. In some embodiments, fire detection and alert system 200 is or includes automatic activation system 50. In some embodiments, fire detection and alert system 200 is configured to cause automatic activation system 50 to activate fire suppression system 10 in response to detecting a fire. In some embodiments, fire detection and alert system 200 includes all of the functionality of automatic activation system 50. In some embodiments, fire detection and alert system 200 replaces automatic activation system 50 and is configured to cause actuator 30 and/or activation mechanism 36 to allow fluid to flow out of fire suppressant tank 12 and/or cartridge 20. In some embodiments, fire detection and alert system 200 is configured to activate fire suppression system 10 such that the expellant gas exits internal volume 22 of cartridge 20 through neck 24 and the fire suppressant exits internal volume 14 of fire suppressant tank 12 through neck 16. Fire detection and alert system 200 includes fire suppression system 10, suppression system activator 208, controller 212, alarm device 214, and messaging service 216, according to some embodiments. Fire detection and alert system 200 is configured to monitor various temperature readings from temperature sensors 204 to detect fires, according to some embodiments. Advantageously, fire detection and alert system 200 can be used as an early detection and fire prevention system to detect a fire before it occurs, and notify a user such that the act to prevent the fire before the fire actually starts.

Fire detection and alert system 200 includes one or more sensors, shown as temperature sensors 204 (e.g., thermocouples, resistance temperature detectors, etc.), according to some embodiments. In some embodiments, temperature sensors 204 are configured to measure/monitor a temperature inside a hood (e.g., exhaust hood), shown as hood 202. In some embodiments, temperature sensors 204 are positioned within hood 202. In some embodiments, temperature sensors 204 are positioned (e.g., coupled, mounted, removably attached, etc.) to an interior surface of hood 202. In other embodiments, sensors 204 are positioned outside of hood 202.

Temperature sensors 204 are configured to provide controller 212 with real time temperature readings, according to some embodiments. In some embodiments, temperature sensors 204 provide controller 212 with signals indicating one or more real time temperature readings (e.g., temperature data, temperature measurements, monitored temperature values, sensed temperature values, etc.). As shown in FIG. 2, only three temperature sensors 204 are used in fire detection and alert system 200, however, more or less than three temperature sensors 204 may be used (e.g., four, five, six, etc.) in various alternative embodiments. In some embodiments, temperature sensors 204 are configured to wirelessly communicate with controller 212 to provide controller 212 with the real time temperature readings. In some embodiments, temperature sensors 204 are wiredly and communicably connected to controller 212 (e.g., via wire 218). In some embodiments, wire 218 is cladded (e.g., coated, surrounded, enclosed within, etc.) with a thermally resistive material. In some embodiments the thermally resistive material prevents wire 218 from becoming damaged due to high temperatures which wire 218 may be exposed to.

Controller 212 is configured to receive the real time temperature data or readings from temperature sensors 204 and determine if a fire has occurred or if a fire is likely to occur based on the real time temperature readings, according to some embodiments. In some embodiments, controller 212 includes a Human Machine Interface (HMI). Controller 212 may be configured to detect sudden changes of the real time temperature readings and provide suppression system activator 208 with activation signals. In some embodiments, suppression system activator 208 is configured to receive the activation signals from controller 212 and activate fire suppression system 10. Fire suppression system 10 includes one or more nozzles 42 fluidly coupled to suppressant tank 12 via pipe 40, according to some embodiments. In some embodiments, suppression system activator 208 is configured to activate fire suppression system 10 such that fire suppressing agent flows out of the fire suppressant tank 12, through pipe 40, and exits nozzles 42 to extinguish a fire present in hood 202. In some embodiments, suppression system activator 208 is configured to activate actuator 30 in response to receiving activation signals from controller 212.

Controller 212 may output information to alarm device 214, according to some embodiments. In some embodiments, alarm device 214 is configured to provide any of a visual and an aural alert in response to receiving a command from controller 212. In some embodiments, alarm device 214 includes one or more light emitting devices (e.g., light emitting diodes) and is configured to actuate the one or more light emitting devices in response to receiving a command/indication from controller 212. In some embodiments, alarm device 214 includes a display screen (e.g., an LCD screen, an LED screen, etc.), configured to provide a message to a user regarding the command received from controller 212. In some embodiments, the type of alert provided by alarm device 214 depends on the command received from controller 212. For example, in some embodiments, controller 212 provides alarm device 214 with a command to produce a visual alert. In some embodiments, controller 212 may provide alarm device 214 with a command to produce both a visual and an aural alert (e.g., actuating/flashing one or more light emitting devices and producing a noise with a speaker).

Alarm device 214 may include any number of visual display devices (e.g., screens, displays, light emitting devices, etc.) and/or any number of aural alert devices (e.g., sirens, speakers, etc.). In some embodiments, alarm device 214 produces a visual and/or an aural alert in response to a command received from controller 212. In some embodiments, alarm device 214 is configured to provide individuals with an alert (e.g., visual, aural, a combination of both) in a nearby area (e.g., a kitchen). For example, if fire detection and alert system 200 is in a kitchen, alarm device 214 can provide any individuals within the kitchen with an alert, a warning, a notification, etc.

In some embodiments, controller 212 is configured to provide message service 216 with a message regarding any of an alert, a warning, a notification of activation of fire suppression system 10, one or more real time temperature readings, historical temperature readings, etc. In some embodiments, message service 216 is a component of controller 212. In some embodiments, message service 216 is a remote server configured to receive the message from controller 212 and provide an alert to a remotely situated person of interest. In some embodiments, message service 216 is a Short Message Service (SMS), configured to send an SMS message to a user device (e.g., a cellular device, a smartphone, etc.). In some embodiments, message service 216 provides the user with the message (e.g., an alert message, a warning message, a notification message, etc.) via a smart phone application. For example, message service 216 may provide the message/alert to a remote server, and a user may access the remote server with a wirelessly communicable device (e.g., a smart phone, a computer, a tablet, etc.). In some embodiments, controller 212 includes a wireless radio configured to provide the remotely situated user/person of interest with any of an alert, an alarm, a notification, etc. In some embodiments, the alert, message, alarm, notification, etc., is any of an SMS message, an email, an automated phone call, etc.

In some embodiments, fire detection and alert system 200 includes an ambient sensor (e.g., a thermocouple), shown as ambient temperature sensor 210. In some embodiments, ambient temperature sensor 210 is configured to measure (e.g., monitor, record, detect, sense, etc.) an ambient temperature outside of hood 202. In some embodiments, ambient temperature sensor 210 is configured to provide controller 212 with real time temperature readings of the ambient temperature outside of hood 202. In some embodiments, ambient temperature sensor 210 is wiredly and communicably connected with controller 212. In some embodiments, ambient temperature sensor 210 is a wireless sensor, configured to wirelessly communicate with controller 212 to provide controller 212 with real time ambient temperature readings. For example, if fire detection and alert system 200 is positioned with a kitchen, ambient temperature sensor 210 may be positioned within a dining area and measure ambient temperature in the dining area.

Controller Diagram

Figure 3:
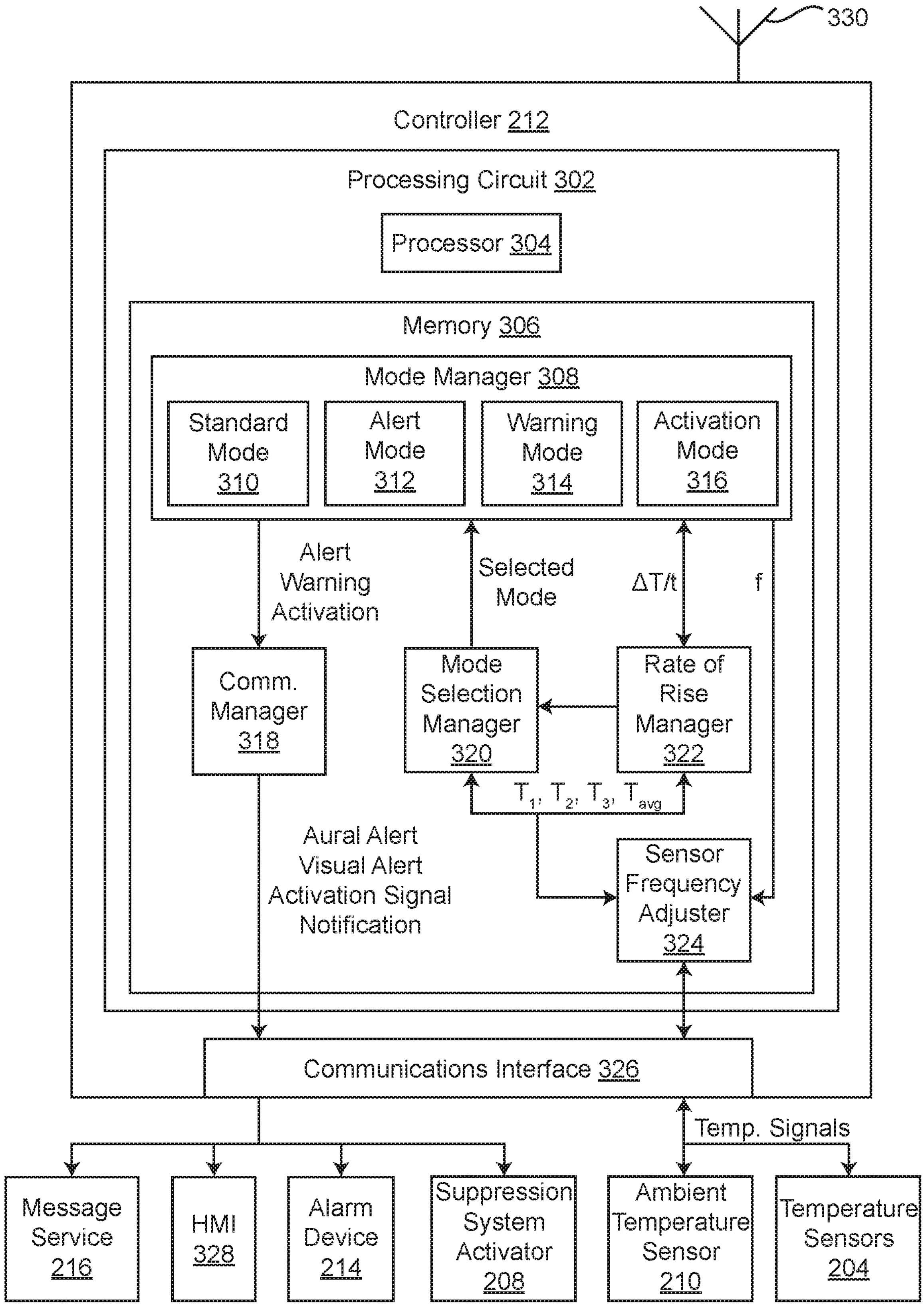
FIG. 3 is a block diagram of the controller of FIG. 2, according to some embodiments.

Referring now to FIG. 3, controller 212 is shown in greater detail, according to some embodiments. In some embodiments, controller 212 is configured to receive any of the real time temperature data or readings from temperature sensors 204 and/or the real time ambient temperature data or reading from ambient temperature sensor 210 to determine if a fire has occurred or if a fire is likely to occur.

Controller 212 is shown to include a communications interface 326, according to some embodiments. Communications interface 326 may facilitate communications between controller 212 and external applications (e.g., temperature sensors 204, message service 216, etc.) for facilitating any of user control, monitoring, alarm output, adjustment, etc., to any of temperature sensors 204, ambient temperature sensor 210, suppression system activator 208, alarm device 214, HMI 328, message service 216, or any other device, system, sensor, inputs, outputs, etc. Communications interface 326 may also facilitate communications between controller 212 and a remote server or remote system.

Communications interface 326 can be or include wired or wireless communications interfaces (e.g., jacks, antennas, transmitters, receivers, transceivers, wire terminals, etc.) for conducting data communications with any of message service 216, HMI 328, alarm device 214, suppression system activator 208, temperature sensors 204, ambient temperature sensor 210, a remote server, or other external systems or devices. In various embodiments, communications via communications interface 326 can be direct (e.g., local wired or wireless communications) or via a communications network (e.g., a WAN, the Internet, a cellular network, etc.). For example, communications interface 326 can include an Ethernet card and port for sending and receiving data via an Ethernet-based communications link or network. In another example, input interface communications interface 326 can include a Wi-Fi transceiver for communicating via a wireless communications network. In another example, communications interface 326 can include cellular or mobile phone communications transceivers.

Still referring to FIG. 3, controller 212 is shown to include a processing circuit 302 including a processor 304 and memory 306, according to some embodiments. Processing circuit 302 can be communicably connected to communications interface 326 such that processing circuit 302 and the various components thereof can send and receive data via communications interface 326. Processor 304 can be implemented as a general purpose processor, an application specific integrated circuit (ASIC), one or more field programmable gate arrays (FPGAs), a group of processing components, or other suitable electronic processing components.

Memory 306 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 306 can be or include volatile memory or non-volatile memory. Memory 306 can include database components, object code components, script components, or any other type of information structure for supporting the various activities and information structures described in the present application. According to some embodiments, memory 306 is communicably connected to processor 304 via processing circuit 302 and includes computer code for executing (e.g., by processing circuit 302 and/or processor 304) one or more processes described herein.

Referring still to FIG. 3, memory 306 is shown to include sensor frequency adjuster 324, according to some embodiments. In some embodiments, sensor frequency adjuster 324 is configured to receive signals from temperature sensors 204 and/or ambient temperature sensor 210 indicating temperature readings. In some embodiments, sensor frequency adjuster 324 receives continuous signals from temperature sensors 204 and/or ambient temperature sensor 210. In some embodiments, sensor frequency adjuster 324 receives the signals from temperature sensors 204 and/or ambient temperature sensor 210 via communications interface 326. In some embodiments, sensor frequency adjuster 324 is configured to sample any of the signals received from adjust the sampling rate $f_{sample}$ based on a mode of operation of controller 212 (e.g., standard mode 310, alert mode 312, warning mode 314, activation mode 316, etc.). In some embodiments, sensor frequency adjuster 324 receives signals from temperature sensors 204 and/or ambient temperature sensor 210 via communications interface 326, samples the signals at sampling rate $f_{sample}$, and provides time series data to any of mode selection manager 320 and rate of rise manager 322.

In some embodiments, sensor frequency adjuster 324 receives time series data from temperature sensors 204 and/or ambient temperature sensor 210. In some embodiments, sensor frequency adjuster 324 is configured to adjust the polling rate ($f_{poll}$) of temperature sensors 204 and/or ambient temperature sensor 210. In some embodiments, sensor frequency adjuster 324 provides mode selection manager 320 and/or rate of rise manager 322 with the time series data received from temperature sensors 204 and/or ambient temperature sensor 210. For example, sensor frequency adjuster 324 may adjust the polling rate of temperature sensors 204 and/or ambient temperature sensor 210 from a polling rate of 0.1 Hz to a faster polling rate of 1 Hz.

In some embodiments, sensor frequency adjuster 324 is configured to provide mode selection manager 320 and/or rate of rise manager 322 with time series data of $T_1$, $T_2$, $T_3$, $T_{avg}$, and $T_{amb}$, where $T_1$ is a temperature reading of a first temperature sensor of temperature sensors 204, $T_2$ is a temperature reading of a second sensor of temperature sensors 204, $T_3$ is a temperature reading of a third temperature sensor of temperature sensors 204, $T_{avg}$ is an average temperature reading of temperature sensors 204, and $T_{amb}$ is an ambient temperature reading of ambient temperature sensor 210. In some embodiments, sensor frequency adjuster 324 is configured to receive or determine $T_{avg}$. In some embodiments, $T_{avg}$ is an average temperature of temperature readings of temperature sensors 204. For example, in the embodiment shown in FIG. 2, temperature sensors 204 includes three temperature sensors. If temperature sensors 204 includes three sensors, $$T_{avg} = \frac{T_1 + T_2 + T_3}{3},$$

according to some embodiments. In some embodiments, temperature sensors 204 includes more than three sensors. For example, temperature sensors 204 may include an arbitrary number of sensors n. If temperature sensors 204 includes n sensors, $$T_{avg} = \frac{\sum_{i=1}^{n} T_i}{n},$$

according to some embodiments. In some embodiments, sensor frequency adjuster 324 is configured to provide (e.g., either by sampling signals at a sampling rate $f_{sample}$ or by adjusting polling rate $f_{poll}$) mode selection manager 320 and/or rate of rise manager 322 with time series information of any of $T_1$, $T_2$, $T_3$, . . . , $T_n$, $T_{avg}$, and $T_{amb}$.

In some embodiments, sensor frequency adjuster 324 is configured to receive a sampling rate $f_{sample}$ or a polling rate $f_{poll}$ from mode manager 308. Mode manager 308 may include instructions, code, functions, etc., to configure controller 212 to operate according to one or more predefined modes of operation. In some embodiments, mode manager 308 includes standard mode 310, alert mode 312, warning mode 314, and activation mode 316. For example, in some embodiments, standard mode 310 causes sensor frequency adjuster 324 to operate at a sampling/polling rate of 0.1 Hz. In some embodiments, standard mode 310 causes sensor frequency adjuster 324 to operate at a sampling/polling rate of 1 Hz in response to an indication that a fire may occur.

Referring still to FIG. 3, memory 306 is shown to include mode selection manager 320, according to some embodiments. In some embodiments, mode selection manager 320 is configured to transition controller 212 between various modes of operation. In some embodiments, mode selection manager 320 is configured to select one of standard mode 310, alert mode 312, warning mode 314, and activation mode 316 of mode manager 308 to cause controller 212 to operate according to the selected mode. In some embodiments, mode selection manager 320 receives time series data from sensor frequency adjuster 324 regarding any of $T_1$, $T_2$, $T_3$, . . . , $T_n$, $T_{avg}$, and $T_{amb}$. In some embodiments, mode selection manager 320 transitions controller 212 between any of modes 310-316 based on $T_1$, $T_2$, $T_3$, . . . , $T_n$, $T_{avg}$, and $T_{amb}$. In some embodiments, for example, mode selection manager 320 transitions controller 212 between one of modes 310-316 to another of modes 310-316 in response to any of $T_1$, $T_2$, and $T_3$ exceeding a predetermined temperature threshold value (e.g., $T_{max,1}$, $T_{max,2}$, $1.3 \cdot T_{ref}$), etc. Methods, algorithms, rules, conditions, etc., which mode selection manager 320 may use to transition between modes 310-316 is described in greater detail below with reference to FIG. 4.

In some embodiments, mode selection manager 320 is configured to compare any of $T_1$, $T_2$, $T_3$, . . . , $T_n$, $T_{avg}$, and $T_{amb}$ to one or more reference/threshold values. In some embodiments, mode selection manager 320 is configured to provide sensor frequency adjuster 324 with an indication regarding any of $T_1$, $T_2$, $T_3$, . . . , $T_n$, $T_{avg}$, and $T_{amb}$ being greater than or less than the one or more reference/threshold values. In some embodiments, sensor frequency adjuster 324 is configured to adjust the sampling rate $f_{sample}$ and/or the polling rate $f_{poll}$ based on the received indication from mode selection manager 320.

Referring still to FIG. 3, memory 306 is shown to include rate of rise manager 322, according to some embodiments. In some embodiments, rate of rise manager 322 receives time series data from sensor frequency adjuster 324 regarding any of $T_1$, $T_2$, $T_3$, . . . , $T_n$ $T_{avg}$, and $T_{amb}$. In some embodiments, rate of rise manager 322 is configured to analyze any of $T_1$, $T_2$, $T_3$, . . . , $T_n$, $T_{avg}$, and $T_{amb}$ over a time period to determine a rate of increase or decrease of any of $T_1$, $T_2$, $T_3$, . . . , $T_n$, $T_{avg}$, and $T_{amb}$ with respect to time. For example, in some embodiments, rate of rise manager 322 determines an average rate of rise over a time period by taking an initial value of any one of $T_1$, $T_2$, $T_3$, . . . , $T_n$, $T_{avg}$, or $T_{amb}$ and taking a final value (e.g., at the end of the time period) of the same one of $T_1$, $T_2$, $T_3$, . . . , $T_n$, $T_{avg}$, or $T_{amb}$, and determining an amount of increase or decrease with respect to the time period. For example, rate of rise manager 322 may take an initial value of $T_{avg}$, wait 10 seconds, take a final value of $T_{avg}$ and determine a rate of change (e.g., rise/increase or decrease) with respect to the time period (i.e., 10 seconds).

In some embodiments, rate of rise manager 322 is configured to determine an instantaneous rate of change of any of $T_1$, $T_2$, $T_3$, . . . , $T_n$, $T_{avg}$, and $T_{amb}$. For example, in some embodiments, rate of rise manager 322 takes an initial value of any of $T_1$, $T_2$, $T_3$, . . . , $T_n$, $T_{avg}$, and $T_{amb}$, at one time step later $$\left(\text{e.g., } t_{timestep} = \frac{1}{f}\right)$$

take a rural value of $T_1$, $T_2$, $T_3$, . . . , $T_n$, $T_{avg}$, and $T_{amb}$, and determine a rate of change of the selected $T_1$, $T_2$, $T_3$, . . . , $T_n$, $T_{avg}$, or $T_{amb}$ over the time step. In some embodiments, rate of rise manager 322 uses the equation $$v = \frac{\Delta T}{t},$$

where v is a rate of change of a temperature, $\Delta T$ is an amount of change of the temperature, and t is a time duration. The time duration t may be a single time step $$\left(\text{e.g., } t_{timestep} = \frac{1}{f}\right),$$

may be multiple time steps, or may be any other time duration (e.g., 10 seconds).

In some embodiments, rate of rise manager 322 provides mode selection manager 320 with the determined rate of change of one or more of $T_1$, $T_2$, $T_3$, . . . , $T_n$, $T_{avg}$, or $T_{amb}$. In some embodiments, mode selection manager 320 uses the determined rate of change of the temperature to determine if controller 212 should be transitioned between modes 310-316.

Referring still to FIG. 3, mode manager 308 is shown outputting any of an alert, a warning, an activation command, etc., to communications manager 318. In some embodiments, communications manager 318 is configured to receive any of the alert, warning, activation command, etc., from mode manager 308 and determine a type of alert or warning to output based on the alert, warning, activation command, etc., received from mode manager 308. In some embodiments, communications manager 318 outputs commands to any of message service 216, HMI 328, alarm device 214, and suppression system activator 208 to provide an alert, a message, a notification, a visual alert, an aural alert, etc., to cause suppression system activator 208 to activate fire suppression system 10, etc. In some embodiments, communications manager 318 causes message service 216 to provide a notification, alert, etc., to a remote person of interest (e.g., a restaurant manager). In some embodiments, the notification, alert, etc., provided to the remote person of interest is any of a text (SMS) message, an email, an automated phone call, etc. In some embodiments, communications manager 318 outputs a notification, alert, warning, etc., to a remote server which can be accessed by the remote person of interest. In some embodiments, communications manager 318 uses a wireless radio (e.g., a wireless transceiver, receiver, wirelessly communicable device, cellular dongle, etc.), shown as wireless radio 330 to provide the remote person of interest with the alert, warning, notification, etc. In some embodiments, communications manager 318 outputs a command to suppression system activator 208 to activate fire suppression system 10.

In some embodiments, communications manager 318 causes HMI 328 to provide any of a notification, a warning, an alert, etc., to a user. In some embodiments, the notification, warning, alert, etc., is a textual alert displayed by HMI 328. For example, if communications manager 318 outputs a warning to HMI 328, HMI 328 may display (e.g., via a user interface, a display screen, etc.) a textual warning which states "WARNING."

Referring still to FIG. 3, mode manager 308 is shown to include standard mode 310, alert mode 312, warning mode 314, and activation mode 316, according to some embodiments. In some embodiments, standard mode 310 causes controller 212 to operate according to a standard mode of operation and does not output alerts, alarms, notifications, etc. In some embodiments, alert mode 312 causes any of HMI 328 and alarm device 214 to output a visual alert. In some embodiments, alert mode 312 causes HMI 328 and/or alarm device 214 to output the visual alert during "open" hours (e.g., during business hours, during hours which the restaurant is open, etc.). The purpose of alert mode 312 is to notify a nearby person of interest that one of $T_1$, $T_2$, $T_3$, . . . , $T_n$, $T_{avg}$, or $T_{amb}$ is excessively high and that there is a possibility of fire. In some embodiments, alert mode 312 causes communications manager 318 to provide a remote person of interest with an alert/notification regarding the excessively high temperature. In some embodiments, alert mode 312 provides information regarding any of $T_1$, $T_2$, $T_3$, . . . , $T_n$, $T_{avg}$, or $T_{amb}$ to a remote server, where $T_1$, $T_2$, $T_3$, . . . , $T_n$, $T_{avg}$, and $T_{amb}$ may be remotely monitored by the remote person of interest. In some embodiments, alert mode 312 only provides the remote person of interest with the alert/notification (e.g., a text message, an email, etc.) during "closed" hours (e.g., during hours which the restaurant is closed).

In some embodiments, warning mode 314 alerts a person of interest that the temperature(s) from alert mode 312 is/are continuously increasing at a rapid pace and that there are high probabilities of a hazard (e.g., fire). In some embodiments, warning mode 314 includes a visual alert and an aural alert (e.g., HMI 328 and/or alarm device 214 to cause both a visual and an aural alert). In some embodiments, the visual alert of warning mode 314 is different and/or more visually apparent than the visual alert of alert mode 312. For example, the visual alert of warning mode 314 may include actuating more light emitting devices than the visual alert of alert mode 312, displaying a larger textual alert via HMI 328 and/or alarm device 214 than the visual alert of alert mode 312, etc. In some embodiments, warning mode 314 includes providing a remote person of interest with a notification/alarm/alert/warning regarding the likely occurring hazard. In some embodiments, the remote person of interest can remotely monitor alarms/alerts of fire suppression and alert system 200, remotely monitor $T_1$, $T_2$, $T_3$, . . . , $T_n$, $T_{avg}$, and/or $T_{amb}$, and make a decision to activate fire suppression system 10. In some embodiments, controller 212 and/or communications manager 318 can receive a command from the remote person of interest to activate fire suppression system 10 via wireless radio 330 and/or message service 216. In some embodiments, communications manager 318 receives the command from the remote person of interest via either message service 216 or wireless radio 330 and causes suppression system activator 208 to activate fire suppression system 10 in response to receiving the command from the remote person of interest. In some embodiments, warning mode 314 includes providing the remote person of interest with a notification/alarm/alert (e.g., via SMS or email) during both "open" hours and "closed" hours.

In some embodiments, activation mode 316 includes all of the functionality of warning mode 314 (e.g., alerts, remote alerts/notifications, visual alerts, aural alerts, etc.) in addition to deploying fire suppression system 10. In some embodiments, activation mode 316 includes causing suppression system activator 208 to activate fire suppression system 10. In some embodiments, activation mode 316 includes providing the remote person of interest with a notification that fire suppression system 10 has been activated/deployed. In some embodiments, activation mode 316 includes providing the remote person of interest with $T_1$, $T_2$, $T_3$, . . . , $T_n$, $T_{avg}$, and/or $T_{amb}$ so that the remote person of interest can monitor the situation. The remote person of interest may then call a fire department, if $T_1$, $T_2$, $T_3$, . . . , $T_n$, $T_{avg}$, and/or $T_{amb}$ do not return to acceptable values.

Process

Figure 4:
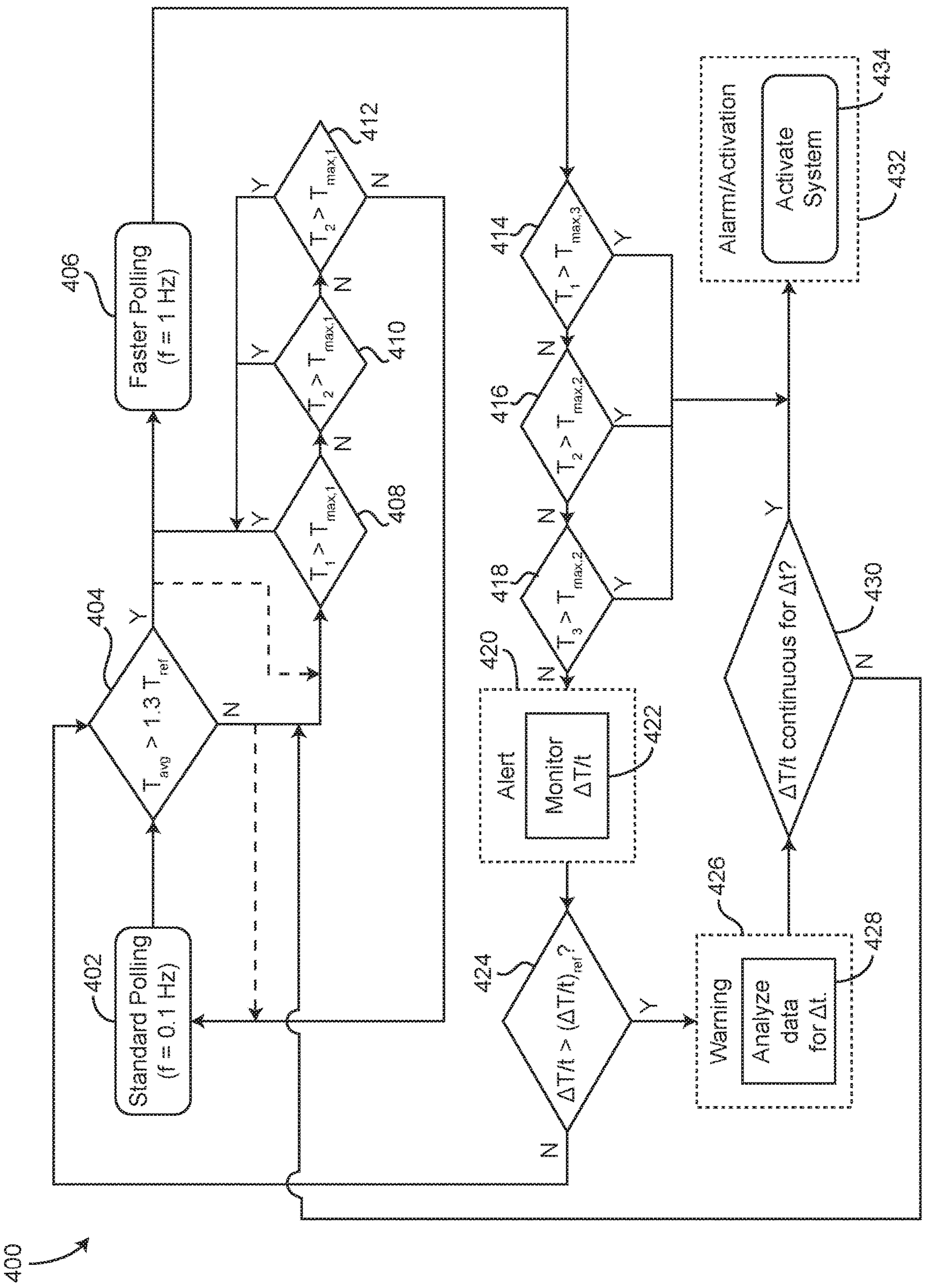
FIG. 4 is a flow diagram of a method which the controller of FIG. 3 may use to detect a hazard, according to some embodiments.

Referring now to FIG. 4, process 400 (e.g., method) is shown, according to one embodiment. In some embodiments, process 400 may be performed by controller 212. In some embodiments, process 400 illustrates the functionality/features of the various modes (e.g., modes 310-316) and various conditions which mode selection manager 320 may use to transition between the various modes.

Process 400 includes polling (or sampling) $T_1$, $T_2$, $T_3$, . . . , $T_n$, $T_{avg}$, and $T_{amb}$ at a standard polling rate (step 402), according to some embodiments. In some embodiments, the standard polling rate is 0.1 Hz (e.g., $T_1$, $T_2$, $T_3$, . . . , $T_n$, $T_{avg}$, and $T_{amb}$ are polled or sampled every 10 seconds). In some embodiments, step 402 is performed by sensor frequency adjuster 324 and/or mode selection manager 320.

Process 400 includes determining if $T_{avg}$ is some threshold percentage greater than a reference temperature value $T_{ref}$ (step 404), according to some embodiments. In some embodiments, the threshold percentage is 30%. In some embodiments, the threshold percentage is adjustable based on application. In some embodiments, step 404 includes determining if $T_{avg}$ is greater than $1.3 \cdot T_{ref}$. In some embodiments, $T_{ref}$ is a normal or expected $T_{avg}$ temperature value. In some embodiments, $T_{ref}$ is determined based on historical temperature information, manufacturer guidelines, application, etc. In some embodiments, $T_{ref}$ is adjustable. In some embodiments, $T_{ref}$ and the threshold percentage are adjustable by a user. For example, a user may adjust $T_{ref}$ and the threshold percentage based on a particular application via HMI 328. In some embodiments, if $T_{avg}$ is greater than (or greater than/equal to) $1.3 \cdot T_{ref}$, process 400 proceeds to step 406. In some embodiments, if $T_{avg}$ is less than $1.3 \cdot T_{ref}$, process 400 continues to steps 408-412. In this way, fire detection and alert system 200 can periodically (e.g., every 10 seconds) check if $T_{avg}$ has increased to a point which may require an alert or further monitoring. In some embodiments, step 404 is performed by mode selection manager 320. In some embodiments, if $T_{avg}$ is less than $1.3 \cdot T_{ref}$, process 400 returns to step 402. In some embodiments, if $T_{avg}$ is greater than $1.3 \cdot T_{ref}$, process 400 proceeds to steps 408-412.

Process 400 includes determining if any of $T_1$, $T_2$, and $T_3$, individually exceed a threshold temperature value, $T_{max,1}$ (steps 408-412), according to some embodiments. In some embodiments, $T_{max,1}$ is set based on a particular application, manufacturers guidelines, etc. In some embodiments, $T_{max,1}$ is adjustable similarly to the threshold percentage described above. In some embodiments, steps 408-412 are performed by mode selection manager 320. In some embodiments, steps 408-412 are performed simultaneously. In some embodiments, steps 408-412 and step 404 are performed simultaneously. In some embodiments, if any of $T_1$, $T_2$, and $T_3$, exceed $T_{max,1}$, process 400 proceeds to step 406. In some embodiments, $T_{max,1}$=200° F.

Process 400 includes increasing the polling/sampling rate (step 406), according to some embodiments. In some embodiments, step 406 includes increasing the polling/sampling rate from the standard polling/sampling rate of step 402. In some embodiments, step 406 is performed by sensor frequency adjuster 324. In some embodiments, step 402 includes increasing the sampling/polling rate to 1 Hz. In some embodiments, process 400 proceeds to steps 414-418 in response to completing step 406.

Process 400 includes checking if any of $T_1$, $T_2$, and $T_3$ individually exceed a second threshold temperature value, $T_{max,2}$ (steps 414-418), according to some embodiments. In some embodiments, steps 414-418 are performed by mode selection manager 320. In some embodiments, $T_{max,2}$=360° F. In some embodiments, $T_{max,2}$ is adjustable similarly to $T_{max,1}$. In some embodiments, $T_{max,2}$ is set (e.g., based on application, manufacturer, etc.) similarly to $T_{max,1}$. In some embodiments, if any of $T_2$, and $T_3$ exceed $T_{max,2}$, process 400 proceeds to alarm/activation step 432. In some embodiments, if none of $T_1$, $T_2$, and $T_3$ exceed $T_{max,2}$, process 400 proceeds to step 420. In some embodiments, steps 414-418 are performed simultaneously.

Process 400 includes providing an alert and monitoring a rate of change of a temperature value (steps 420 and 422), according to some embodiments. In some embodiments, steps 420 and 422 include providing an alert to a user or a remote person of interest regarding any of $T_{avg}$ being greater than $1.3 \cdot T_{ref}$, or one or more of $T_1$, $T_2$, and $T_3$ exceeding $T_{max,1}$. In some embodiments, step 420 is performed by any of or a combination of mode manager 308, communications manager 318, message service 216, HMI 328, alarm device 214, and wireless radio 330. In some embodiments, step 422 includes monitoring/analyzing a rate of change of a temperature value. For example the rate of change of any of $T_1$, $T_2$, $T_3$, and $T_{avg}$ may be monitored/analyzed to determine if the temperature is increasing rapidly. In some embodiments, step 422 is performed by rate of rise manager 322. In some embodiments, step 420 includes transitioning controller 212 into alert mode 312.

Process 400 includes determining if a rate of change of any of $T_1$, $T_2$, $T_3$, and $$T_{avg}\left(\frac{\Delta T}{t}\right)$$

is greater than a rate of change threshold value $$\left(\frac{\Delta T}{t}\right)_{ref}$$

(step 424), according to some embodiments. In some embodiments, the rate of change threshold value $$\left(\frac{\Delta T}{t}\right)_{ref}$$

is 2 F.°/sec. In some embodiments, a different rate of change threshold value is used for $T_{avg}$ as compared to the rate of change threshold value used for $T_1$, $T_2$, and $T_3$. In some embodiments, an instantaneous rate of change of any of $T_1$, $T_2$, $T_3$, and $T_{avg}$ is compared to the rate of change threshold value(s). In some embodiments, an average rate of change of any of $T_1$, $T_2$, $T_3$, and $T_{avg}$ is compared to the rate of change threshold value(s). In some embodiments, if the rate of change is less than the reference/threshold rate of change value, process 400 returns to step 404. In some embodiments, if the rate of change is greater than the reference/threshold rate of change value, process 400 proceeds to step 426. In some embodiments, $$\left(\frac{\Delta T}{t}\right)_{ref}$$

is adjustable or is set similarly to $T_{max,2}$ as described above.

Process 400 includes providing a warning to any of a nearby user or a remote person of interest (step 426) and analyzing temperature data for a time period Δt (step 428), according to some embodiments. In some embodiments, step 426 includes causing controller 212 to operate according to (e.g., transitioning into) warning mode 314 as described in greater detail above with reference to FIG. 2. In some embodiments, step 426 is performed by any of or a combination of mode manager 308, communications manager 318, message service 216, HMI 328, alarm device 214, and wireless radio 330. In some embodiments, step 428 includes receiving temperature data over time period Δt and analyzing the received temperature data. In some embodiments, step 428 is performed by rate of rise manager 322. In some embodiments, time period Δt is 10 seconds.

Process 400 includes determining if the rate of change of the temperature is continuous for time period Δt (step 430), according to some embodiments. In some embodiments, step 430 includes determining an initial rate of change of the temperature and a beginning of time period Δt and a final rate of change of the temperature at and end of time period Δt. In some embodiments, if both the initial rate of change of the temperature and the final rate of change of the temperature are positive (e.g., temperature is increasing across time period Δt), process 400 proceeds to step 432. In some embodiments, step 430 includes determining if the rate of change of the temperature for each interval $$\left(\text{e.g., } \frac{1}{f}\right)$$

within time period Δt is positive. In some embodiments, if the rate of change of the temperature for each interval within time period Δt is positive (e.g., temperature is continuously increasing across time period Δt), process 400 proceeds to step 432. In some embodiments, step 430 includes determining if the rate of change of the temperature for each interval within time period Δt is the same or substantially the same.

Process 400 includes transitioning controller 212 into activation mode 316 (step 432) and activating fire suppression system 10 (step 434), according to some embodiments. In some embodiments, step 432 is performed by mode selection manager 320 and mode manager 308. In some embodiments, the various alerts, alarms, notifications, warning, aural alerts, visual alerts, etc., of step 432 are facilitated by any of or a combination of communications manager 318, message service 216, HMI 328, alarm device 214, and wireless radio 330. In some embodiments, step 434 is performed by communications manager 318 and suppression system activator 208.

Example Graph

Figure 5:
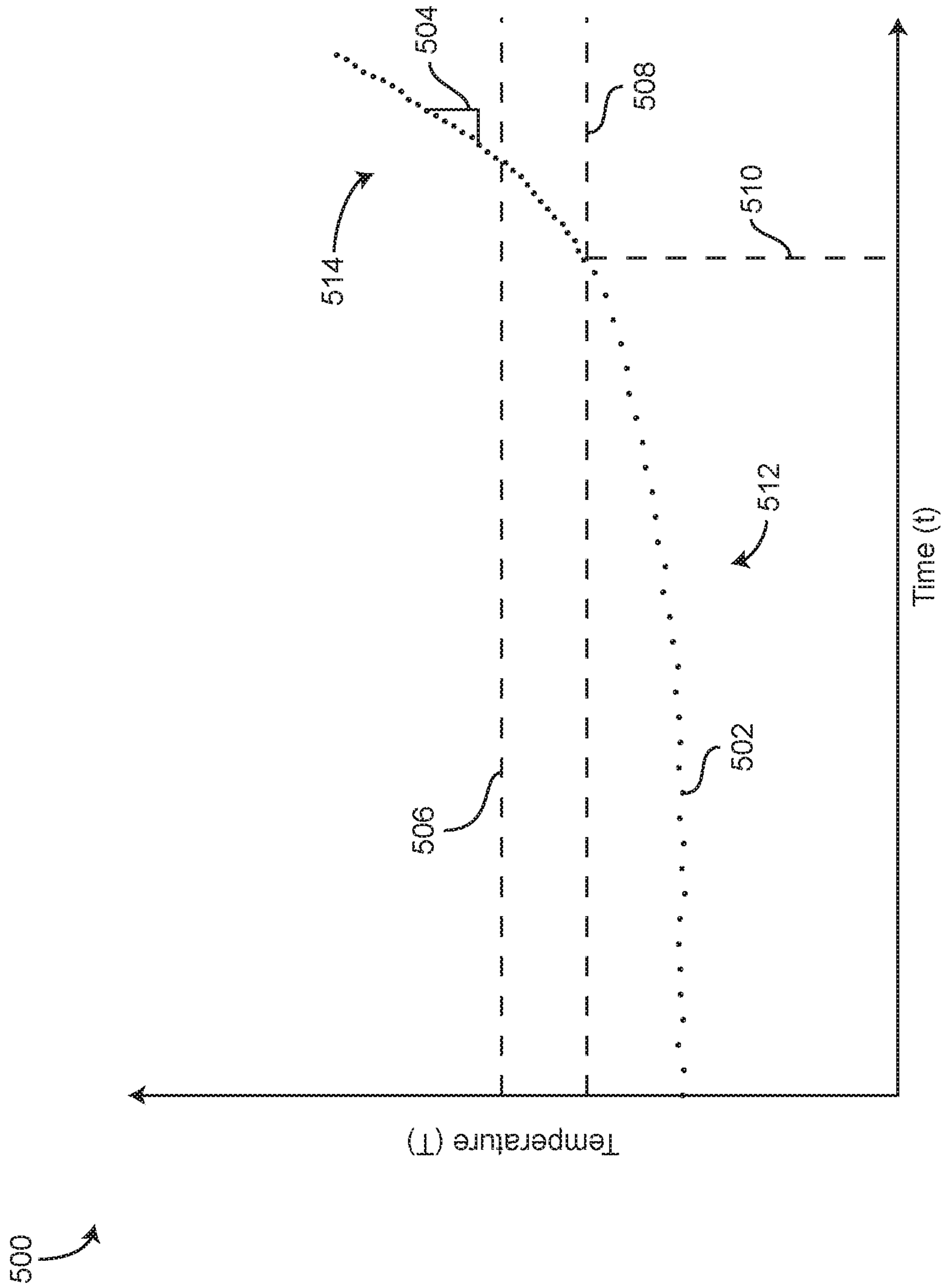
FIG. 5 is a graph showing time series data of a temperature which the controller of FIG. 2 may use to detect a hazard, according to some embodiments.

Referring now to FIG. 5, graph 500 illustrates various data received from a temperature sensor (e.g., one of temperature sensors 204, an average of temperature sensors 204, etc.), according to some embodiments. FIG. 5 illustrates time series temperature information which controller 212 may use to determine, detect, or predict a hazard (e.g., a fire). FIG. 5 also visually illustrates various parameters $$\left(\text{e.g., } \frac{\Delta T}{t}\right)$$

which controller 212 may calculate or use to detect the hazard. The Y-axis of graph 500 illustrates temperature (variable T) and the X-axis of graph 500 illustrates time (variable t), according to some embodiments. Series 502 of graph 500 illustrates various temperature readings over a time period, according to some embodiments. Series 502 includes a first portion 512 and a second portion 514. In some embodiments, the temperature values of first portion 512 are sampled/polled at a first rate, and the temperature values of second portion 514 are sampled/polled at a second rate, with the second rate being faster than the first rate. As can be seen in FIG. 5, series 502 indicates that temperature is increasing throughout first portion 512, according to some embodiments. In some embodiments, the temperature increases until it exceeds temperature threshold value 508. In some embodiments, temperature threshold value 508 is $T_{max,1}$. In some embodiments, once the temperature has reached temperature threshold value 508 at time 510, the sampling/polling rate is adjusted (e.g., second portion 514 begins and first portion 512 ends). As shown in FIG. 5, the temperature continues to increase throughout second portion 514, according to some embodiments. If the temperature exceeds second temperature threshold value 506 (e.g., $T_{max,2}$, a rate of change 504 of the temperature $$\left(\text{e.g., } \frac{\Delta T}{t}\right)$$

is determined, according to some embodiments. In some embodiments, the rate of change 504 of the temperature is an average rate of change (as shown in FIG. 5). In some embodiments, the rate of change 504 of the temperature is calculated between subsequently occurring data points of the temperature (e.g., instantaneous rate of change).

Fire detection and alert system 200 provides several advantages, according to some embodiments. First, fire detection and alert system 200 can be used as an early fire detection and prevention system, according to some embodiments. For example, fire detection and alert system 200 may provide alerts, alarms, notifications, warnings, messages, etc. to either a nearby user (e.g., a kitchen worker) or a remote person of interest, which indicate that a fire may occur or is likely to occur. The nearby user or the remote person of interest can use the indication that the fire may occur to prevent the fire from occurring or to extinguish the fire when the fire is controllable and relatively small. Second, fire detection and alert system 200 facilitates easy remote monitoring, according to some embodiments. The remote person of interest may monitor the various temperature values (e.g., $T_1$, $T_2$, etc.) and remain informed regarding temperatures rising, operations of fire detection and alert system 200, etc. Further, fire detection and alert system 200 automatically activates fire suppression system 10 in response to detecting a fire. Advantageously, if there are no users nearby fire detection and alert system 200, fire detection and alert system 200 can automatically detect and extinguish the fire before it spreads, according to some embodiments. Further yet, first detection and alert system 200 uses various stages of alert/alarm (e.g., alert mode, warning mode, activation mode, etc.), which may reduce false-alarms.

While fire detection and alert system 200 is shown in FIG. 2 applied to an exhaust hood in a kitchen, it should be noted that fire detection and alert system 200 as described herein may be used for a variety of applications. For example, fire detection and alert system 200 may be used in a building, a room, a car, a boat, an over, a burner, a stove top, a laboratory, a welding application, a factory, various machinery, etc. In some embodiments, any of the functionality and methods described in greater detail above with reference to FIGS. 3-5 may be applied to any situation where a fire may occur, provided controller 212 can receive temperature information from temperature sensors (e.g., temperature sensors 204).

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the fusible link 54 may be incorporated in the automatic activation system 50 . Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fire suppression system, comprising:

a temperature sensor configured to monitor a temperature;

a suppression system activator configured to activate the fire suppression system to suppress a fire; and processing circuitry configured to:

increase a polling rate of the temperature sensor from a first polling rate to a second polling rate in response to an average value of the temperature exceeding a reference temperature by a threshold amount;

determine, in a first mode of operation subsequent to the increase of the polling rate, a fire alert in response to the monitored temperature exceeding a second temperature threshold value greater than a first temperature threshold value;

switch to a second mode of operation to determine, based on the monitored temperature exceeding the second temperature threshold value, a rate of change of the monitored temperature over a time period; and activate, in a third mode of operation, the fire suppression system to provide a fire suppressant agent, based on the rate of change exceeding a rate of change threshold value over the time period.

2. The fire suppression system of claim 1, wherein the fire suppression system comprises a plurality of temperature sensors configured to monitor a plurality of temperature values at a plurality of different locations, wherein the processing circuitry is configured to:

determine the fire alert in response to at least one of the plurality of monitored temperature values exceeding the second temperature threshold value;

determine the rate of change as a rate of change of at least one of the monitored temperatures over the time period;

determine a fire warning in response to the rate of change of at least one of the plurality of monitored temperatures over the time period exceeding the rate of change threshold value; and activate the fire suppression system in response to the rate of change of at least one of the plurality of monitored temperatures exceeding the rate of change threshold value.

3. The fire suppression system of claim 2, wherein the processing circuitry is further configured to monitor the rate of change of at least one of the plurality of monitored temperatures over a monitoring time period.

4. The fire suppression system of claim 3, wherein the processing circuitry is further configured to activate the fire suppression system in response to at least one of:

one or more of the plurality of monitored temperatures exceeding a maximum allowable temperature threshold value; or the monitored rate of change of at least one of the plurality of monitored temperatures being continuous over the monitoring time period.

5. The fire suppression system of claim 1, wherein the processing circuitry is further configured to output at least one of a visual alert, an aural alert, or a remote alert in response to any of the fire alert, a fire warning, and an indication of the activation of the fire suppression system.

6. The fire suppression system of claim 5, wherein the remote alert comprises at least one of:

a text message;

an email; or a phone call.

7. A method, comprising:

providing a plurality of temperature sensors configured to monitor a plurality of temperatures;

providing a fire suppression system configured to suppress a fire;

increasing a polling rate of the plurality of temperature sensors in response to at least one of the plurality of monitored temperatures exceeding a first temperature threshold value;

monitoring each of the plurality of monitored temperatures from the plurality of temperature sensors to determine, in a first mode of operation, a fire alert in response to any of the plurality of monitored temperatures subsequent to the increase of the polling rate exceeding a second temperature threshold value greater than the first threshold temperature value;

switching to a second mode of operation, based on the monitored temperature exceeding the second temperature threshold value, to determine a rate of change of at least one of the plurality of monitored temperatures over a time period; and activating, in a third mode of operation the fire suppression system to output a fire suppressant agent based on the rate of change exceeding a rate of change threshold value.

8. The method of claim 7, further comprising:

determining a fire warning in response to the rate of change exceeding the rate of change threshold value;

outputting any of the fire alert, the fire warning, or an indication of the activation of the fire suppression system to a user; and monitoring the rate of change of at least one of the plurality of monitored temperatures over a monitoring time period.

9. The method of claim 8, further comprising activating the fire suppression system in response to at least one of:

one or more of the plurality of monitored temperatures exceeding a maximum allowable temperature threshold value; or the monitored rate of change of at least one of the plurality of monitored temperatures being continuous over the monitoring time period.

10. The method of claim 7, further comprising outputting at least one of a visual alert, an aural alert, or a remote alert in response to any of the fire alert, a fire warning, or the activation of the fire suppression system.

11. The method of claim 10, wherein the remote alert comprises at least one of:

a text message;

an email; or a phone call.

12. The method of claim 7, further comprising determining an average temperature of the plurality of monitored temperatures.

13. The method of claim 12, further comprising adjusting the polling rate of the plurality of temperatures in response to the average temperature exceeding a reference value by a predefined amount.

14. A controller for a fire suppression system comprising processing circuitry configured to:

receive sensor data from a plurality of temperature sensors indicating a plurality of monitored temperatures;

increase a polling rate of one or more of the plurality of temperature sensors from a first polling rate to a second polling rate in response to an average value of any of the plurality of monitored temperatures exceeding a reference temperature by a threshold amount;

determine, in a first mode of operation subsequent to the increase of the polling rate, a fire alert in response to any the plurality of monitored temperatures exceeding a second temperature threshold value greater than a first temperature threshold value;

switch to a second mode of operation, based on a rate of change of any of the plurality of monitored temperatures exceeding a rate of change threshold over a time period; and activate, in a third mode of operation, a fire suppression system to provide a fire suppressant agent based on the rate of change of the plurality of monitored temperatures over the time period exceeding the rate of change threshold, the rate of change determined in the second mode of operation subsequent to the any of the plurality of monitored temperatures exceeding the second temperature threshold value.

15. The controller of claim 14, wherein the processing circuitry is configured to:

determine a fire warning in response to the rate of change of the plurality of monitored temperatures over the time period exceeding the rate of change threshold;

output any of the fire alert, the fire warning, or an indication of the activation of the fire suppression system to a user; and monitor the rate of change over a monitoring time period.

16. The controller of claim 14, wherein the processing circuitry is configured to activate the fire suppression system to provide the fire suppressant agent to an area in response to the fire alert.

17. The controller of claim 14, wherein the processing circuitry is configured to output at least one of a visual alert, an aural alert, or a remote alert in response to any of the fire alert or an indication of the activation of the fire suppression system.

* * * * *